(No Model.) 3 Sheets—Sheet 2.
E. MILLER.
DUST COLLECTOR.
No. 554,891. Patented Feb. 18, 1896.
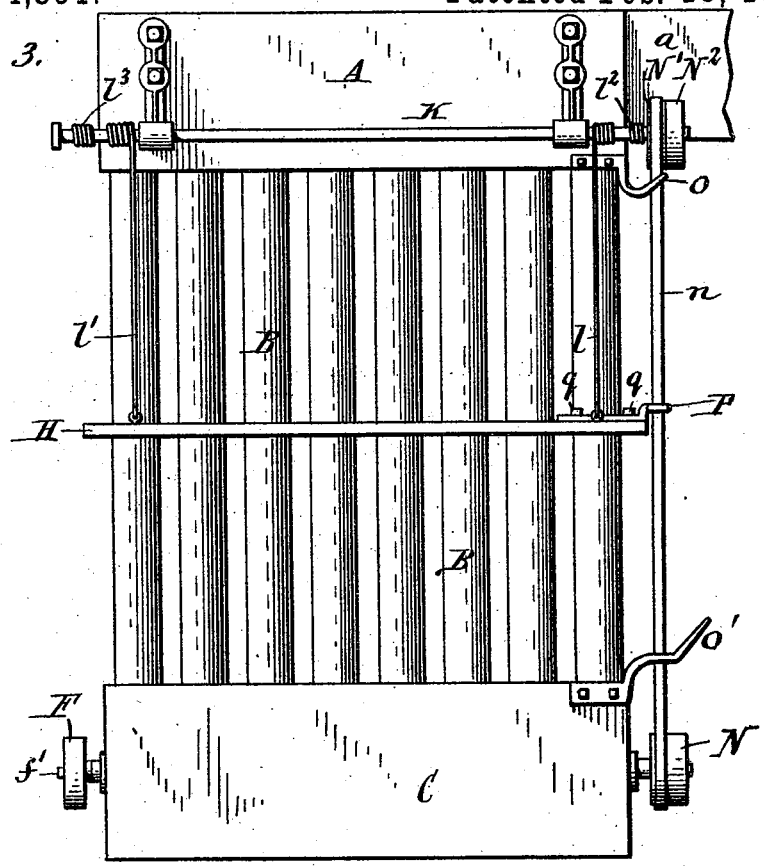
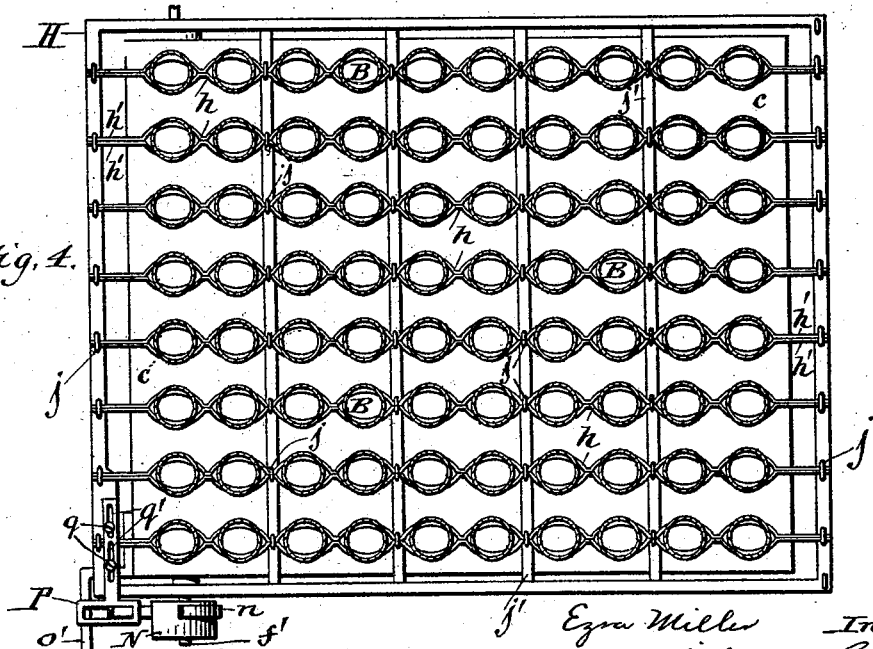

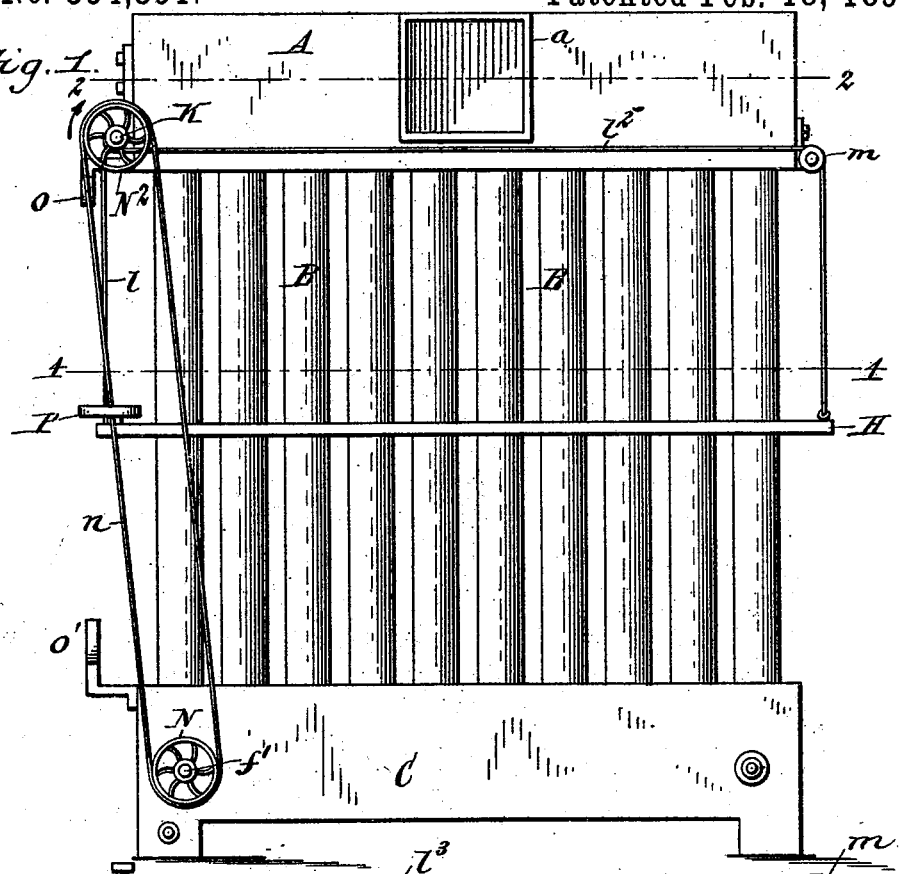

(No Model.) 3 Sheets—Sheet 3.
E. MILLER.
DUST COLLECTOR.
No. 554,891. Patented Feb. 18, 1896.
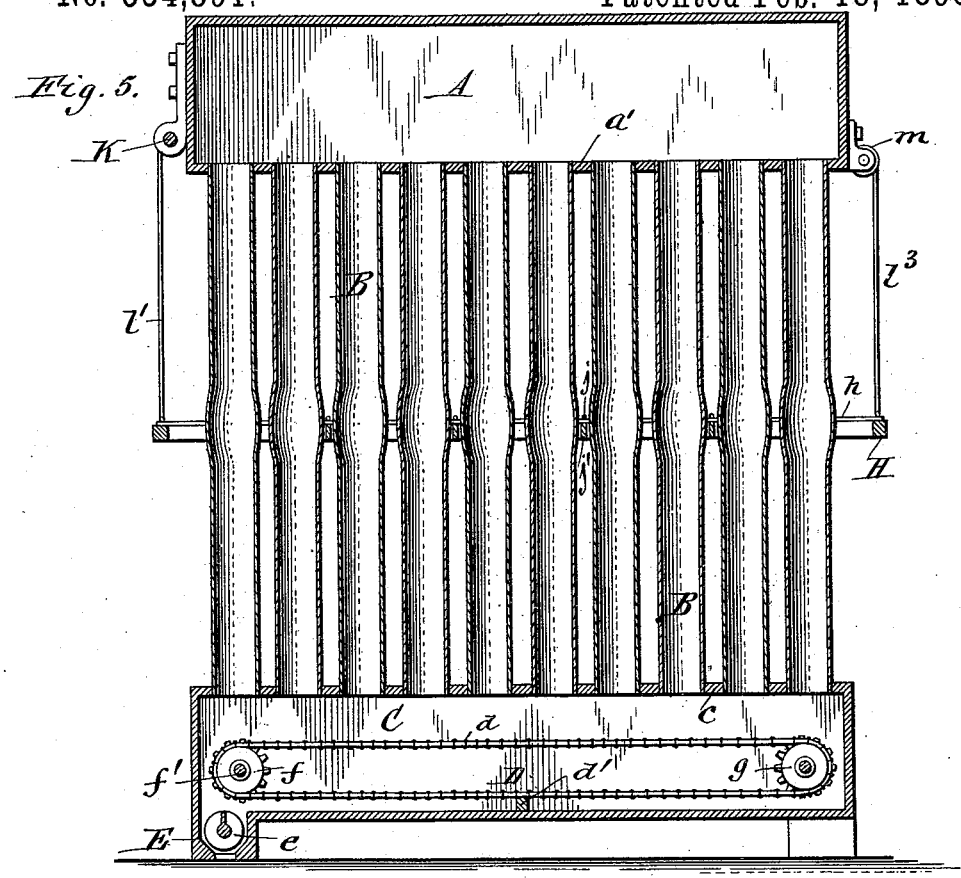
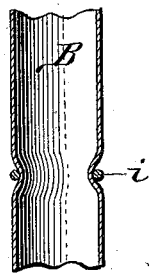
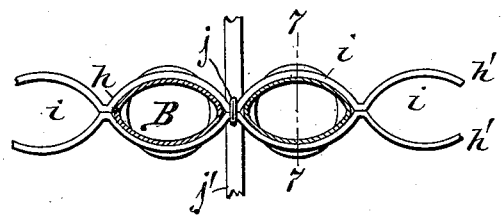
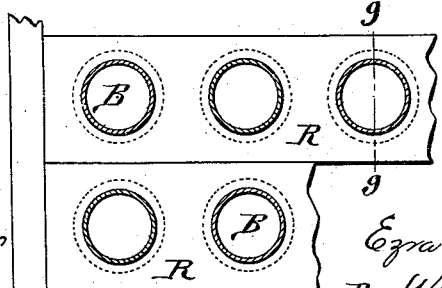
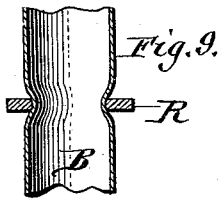
Witnesses:
Theo. L. Popp
Chas. F. Burkhardt
Ezra Miller, Inventor.
By Wilhelm Bonner
Attorneys.

UNITED STATES PATENT OFFICE.

EZRA MILLER, OF CANAL DOVER, OHIO.

DUST-COLLECTOR.

SPECIFICATION forming part of Letters Patent No. 554,891, dated February 18, 1896.

Application filed December 19, 1894. Serial No. 532,308. (No model.)

*To all whom it may concern:*

Be it known that I, EZRA MILLER, a citizen of the United States, residing at Canal Dover, in the county of Tuscarawas and State of Ohio, have invented a new and useful Improvement in Dust-Collectors, of which the following is a specification.

This invention relates to that class of dust-collectors which are provided with filtering or straining tubes or passages constructed of canvas or other flexible material into which the dust-laden air is conducted, and through the meshes of which the air escapes while the dust remains within the tubes or passages and drops into a dust-receptacle below.

The object of this invention is to provide simple and efficient means for dislodging automatically that portion of the dust which accumulates on or adheres to the inner sides of these tubes or passages and so maintain the straining tubes or passages in a clean and effective condition.

In the accompanying drawings, consisting of three sheets, Figure 1 is a side elevation of a dust-collector provided with my improved cleaning device. Fig. 2 is a horizontal section in line 2 2, Fig. 1. Fig. 3 is a front elevation of my improved machine. Fig. 4 is a horizontal section in line 4 4, Fig. 1. Fig. 5 is a vertical sectional elevation in line 5 5, Fig. 2. Fig. 6 is a horizontal section of several of the straining-tubes and the adjacent portions of the cleaner on an enlarged scale. Fig. 7 is a vertical section in line 7 7, Fig. 6. Fig. 8 is a plan view of a cleaner with the tubes in section, showing a modified form of the cleaner. Fig. 9 is a vertical section in line 9 9, Fig. 8.

Like letters of reference refer to like parts in the several figures.

A represents the upper chamber of the dust-collector into which the current of dust-laden air is delivered by the inlet-spout $a$.

B represents the filtering or straining tubes or passages, which are secured with their upper ends in openings formed in the bottom plate, $a'$, of the upper chamber, A, and which extend downwardly therefrom. The tubes B are preferably round or circular in cross-section and are made of canvas or other suitable cloth, which permits the air to escape through its meshes while retaining the dust or other solid matter carried by the air-current.

C represents the dust-receiving chamber with which the lower ends of the filtering-tubes are connected, the top plate, $c$, of this chamber being provided with openings in which the lower ends of the tubes are secured.

D represents a conveyer which is arranged in the dust-receiving chamber C, and by which the dust falling upon the bottom of this chamber is moved to a discharge-trough E, which is arranged at one end of the dust-receiving chamber, somewhat lower than the bottom of the latter, and which is provided with a screw-conveyer $e$, by which the dust is conveyed to a trapped discharge of any ordinary construction, which permits the escape of the air, but prevents the escape of the dust. The conveyer D is preferably composed of two endless chains $d$, carrying a transverse sweep or strip $d'$, by which the dust is moved along the bottom of the dust-receiving chamber to the trough E of the screw-conveyer. The chains $d$ run at one end of the dust-receiving chamber around driven pulleys or wheels $f$, mounted upon a horizontal shaft $f'$, to which power is applied by a driving-pulley F, or other suitable means, and at the opposite end of the chamber around pulleys or wheels $g$.

The upper chamber, A, and the lower chamber, C, of the dust-collector may be separately secured to the mill structure, or they may be connected by posts or other connecting parts, as may be preferred.

In the operation of a dust-collector of this general character the dust-laden air enters the upper chamber and passes downwardly in the tubes, and the air filters through the walls of the tubes and escapes outwardly, leaving the dust or other solid matter behind. The bulk of this separated dust drops down into the lower dust-receiving chamber; but a portion of the dust adheres to the inner sides of the tubes. For the purpose of detaching this adhering dust from the tubes the following cleaning device is employed.

H represents a vertically-movable horizontal frame which is arranged between the upper and lower chambers of the dust-collector, and $h$ are cleaners which are attached to this frame and impinge against the outer sides of the filtering tubes or passages. These cleaners are preferably constructed of stiff wires or light rods which are bent so as to form oblong open strippers $i$, each of which embraces one of the tubes or passages. For the purpose of simplicity and cheapness a row of these strippers working upon a row of the tubes is formed of two wires $h'$, each of which is bent or corrugated to form a succession of half-strippers, and these two wires are placed with the concave sides of their bent portions facing each other and with their salient portions in contact with each other, as shown in Figs. 4 and 6. Each pair of wires is secured in this position by clips $j$ or other suitable fastenings to the movable frame H and also to intermediate supporting-bars $j'$ attached to the frame. The openings of these strippers or cleaners are smaller in one direction than the diameter of the tubes and larger in a direction at right angles to their shortest dimensions, so that these cleaners are oblong or approximately elliptical and have their minor axes shorter than the diameter of the tubes. In consequence of this construction the cleaners impinge against the outer sides of the tubes and bend the fabric out of the cylindrical form which the tubes maintain elsewhere throughout their length by reason of the distention caused by the air-current entering the tubes. This bending of the fabric out of its normal form or position contracts the fabric and opens the meshes thereof, the cleaners causing a sufficient movement of the meshes of the fabric to detach the dust adhering to the inner sides of the tubes, and as the cleaners move up and down along the tubes they bend all portions of each tube successively to open its meshes by squeezing or contracting the tube, and so operate to clean each tube throughout its length by a gentle action, which efficiently clears the fabric from adhering solid matter, while violent and destructive concussions are avoided.

The cleaner may be moved up and down along the tubes by any suitable mechanism, that which is shown in the drawings being constructed as follows:

K represents a horizontal drum-shaft which is arranged horizontally on the front side of the upper dust-chamber, A.

$l\ l'\ l^2\ l^3$ represent four cords which are connected with the four corners of the cleaner-frame and which are fastened to this shaft, so that upon turning the same in the direction of the arrow in Fig. 1 the cords are wound upon the shaft and the cleaner-frame is raised, while by lowering the frame the cords are unwound. The two rear cords run over guide-pulleys $m$ at the lower rear corners of the upper chamber of the dust-collector.

The drum-shaft is rotated for the purpose of elevating the cleaner-frame by a belt $n$, which runs over a driving-pulley N on the conveyer-shaft $f'$ and over a driven pulley $N'$ on the drum-shaft.

$N^2$ is a loose pulley arranged on the outer side of the pulley $N'$ for carrying the belt during the descending movement of the cleaner-frame, which is effected by the weight of the cleaner-frame.

O represents an inclined belt-shifting arm secured to the upper chamber of the dust-collector adjacent to the driving-belt of the drum-shaft, and $O'$ is a similar arm secured to the lower chamber.

P is a movable belt-shifting arm secured to the cleaner-frame and embracing the belt. This arm is capable of movement laterally, so as to shift the belt from the tight pulley $N'$ to the loose pulley $N^2$, and vice versa. As shown in the drawings, this movable shifting-arm is secured to the cleaner-frame by screws $q$ passing through slots $q'$, but other suitable devices for holding the arm movable may be employed. When the cleaner-frame has about reached its highest position, the movable shifting-arm strikes against the inclined under side of the upper fixed shifting-arm and is thereby moved outwardly, and so shifts the belt to the loose pulley. The cleaner-frame is now free to descend by gravity. When it has about reached its lowest position, the movable shifting-arm strikes against the upper side of the incline of the lower shifting-arm, and is thereby returned to its former position and so shifts the belt back to the tight pulley, when the operation of elevating the cleaner-frame is repeated.

Instead of forming the openings of the cleaner or stripper oblong or elliptical they may be made round, but of smaller diameter than the tubes, as represented in Figs. 8 and 9, and, if desired, these cleaners may be formed of boards or slats R, in which the openings are formed, as represented in the same figures.

It is obvious that the mechanical construction of the cleaning mechanism herein shown and described may be varied in various ways without departing from my invention, and that the construction of the dust-collector itself may also be varied in various ways.

I claim as my invention—

1. In a dust-collector, the combination with a flexible filtering tube or passage, into which the dust-laden air is delivered, of a cleaner having a contact-surface recessed transverse the tube, which impinges against the outside of said tube, or passage, squeezing or contracting the tube or passage to open the meshes, and adapted to agitate the tube when it impinges against the same, and mechanism whereby the cleaner is moved along the tube or passage, substantially as set forth.

2. In a dust-collector, the combination with a group of flexible cylindrical filtering tubes or passages into which the dust-laden air is delivered, of a cleaner-frame having members which are arranged between the tubes or passages having a contact-surface recessed transverse the tubes, that embrace and impinge against the outer sides thereof, squeezing or contracting the tube to open the meshes, and thereby disengage the dust from the inside of the tube, and a mechanism whereby the cleaner-frame is moved along the tubes or passages, substantially as set forth.

3. In a dust-collector, the combination with a chamber into which the dust-laden air is blown, flexible tubes or passages extending down from said chamber, and a dust-chamber connected with the lower ends of said tubes or passages, of a cleaner-frame arranged between said two chambers, and members between said tubes, having serrated or scalloped edges which form recesses that embrace and impinge against the outer side of the tube, squeezing or contracting the tubes to open the meshes, and thereby disengage the dust gathered on the inside of the tubes, and mechanism whereby said cleaner-frame is moved up and down along the tubes, between said two chambers, substantially as set forth.

4. In a dust-collector, the combination with series of cylindrical flexible tubes or passages into which the dust-laden air is delivered, of a vibratable cleaner, comprising a supporting-frame, formed with a series of apertures, of a less diameter than the tubes or passages that embrace said tubes and squeeze them in on all sides, to open the meshes to dislodge the dust and mechanism, whereby said cleaner is moved along the tubes or passages, substantially as set forth.

5. In a dust-collector, the combination with a round flexible filtering tube or passage into which the dust-laden air is delivered, of an oblong cleaner, embracing the tube or passage on all sides simultaneously and impinging against the same, and squeezing or contracting to open its meshes, and mechanism whereby the cleaner is moved along the tube or passage, substantially as set forth.

6. In a dust-collector, the combination with the upright filtering tubes or passages, of a cleaner impinging all around the tubes or passages against the outer sides of said tubes or passages, and squeezing or contracting the same to open their meshes, a drum-shaft, cords connecting the cleaner with said shaft, and mechanism whereby the shaft is rotated to elevate the cleaner and released to allow the descent of the cleaner, substantially as set forth.

7. In a dust-collector, the combination with the upright filtering tubes or passages, of a cleaner impinging against the outer sides of said tubes or passages, a drum-shaft provided with tight and loose pulleys, cords connecting the cleaner with said shaft, a driving-belt running said pulleys, a movable belt-shifter on the cleaner, and upper and lower shifting-arms, whereby the belt-shifter is moved to shift the belt, substantially as set forth.

Witness my hand this 14th day of December, 1894.

EZRA MILLER.

Witnesses:
EDWARD WILHELM,
JNO. J. BONNER.